United States Patent
Kobayashi (12)

(10) Patent No.: US 9,498,955 B2
(45) Date of Patent: Nov. 22, 2016

(54) PRINTING DEVICE AND PRINTING METHOD FOR DISCHARGING INK FROM NOZZLE ROW INCLUDING NOZZLE GROUPS

(71) Applicant: SEIKO EPSON CORPORATION, Tokyo (JP)

(72) Inventor: Takashi Kobayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/704,305

(22) Filed: May 5, 2015

(65) Prior Publication Data

US 2015/0343764 A1     Dec. 3, 2015

(30) Foreign Application Priority Data

May 30, 2014    (JP) ................................. 2014-112926

(51) Int. Cl.
     *B41J 2/145*      (2006.01)
     *B41J 2/045*      (2006.01)
     *B41J 2/21*      (2006.01)

(52) U.S. Cl.
     CPC ............. *B41J 2/145* (2013.01); *B41J 2/04535* (2013.01); *B41J 2/04543* (2013.01); *B41J 2/04545* (2013.01); *B41J 2/2132* (2013.01)

(58) Field of Classification Search
     CPC .................... B41J 2/2132; B41J 2/2146; B41J 2/4535; B41J 2/04536; B41J 2/04543; B41J 2/04545; B41J 2/04563; B41J 2/155; B41J 2/145; B41J 2/04535

USPC .................. 347/5, 9, 14, 15, 19, 42, 43, 107
See application file for complete search history.

(56) References Cited

U.S. PATENT DOCUMENTS

| | | | | |
|---|---|---|---|---|
| 6,565,199 B2* | 5/2003 | Ujita | ..................... | B41J 2/17513 347/86 |
| 6,655,783 B2* | 12/2003 | Otsuki | ................... | B41J 2/2132 347/41 |
| 8,403,442 B2* | 3/2013 | Miyashita | .............. | B41J 19/142 347/12 |
| 8,894,177 B2* | 11/2014 | Yoshikawa | ............ | B41J 2/2142 347/19 |

(Continued)

FOREIGN PATENT DOCUMENTS

| | | |
|---|---|---|
| JP | 2010-214887 A | 9/2010 |
| JP | 2011-235592 A | 11/2011 |

(Continued)

*Primary Examiner* — Justin Seo
(74) *Attorney, Agent, or Firm* — Global IP Counselors, LLP

(57) ABSTRACT

A printing device includes a printing head and a control unit. The printing head has a nozzle row with a one end side nozzle group of nozzles of one end side of the nozzle row, an other end side nozzle group of nozzles of an other end side of the nozzle row, and a center nozzle group of nozzles of the nozzle row, which does not correspond to the one and other end side nozzle groups. The control unit is configured to discharge the ink on a designated area on a print medium from the nozzles included in the center nozzle group and the other end side nozzle group with a first movement of the printing head and discharge the ink on the designated area from the nozzles included in the center nozzle group and the one end side nozzle group with a second movement next to the first movement.

8 Claims, 9 Drawing Sheets

(56) References Cited

U.S. PATENT DOCUMENTS

| | | | |
|---|---|---|---|
| 2002/0012035 A1* | 1/2002 | Mouri | C09D 11/324 347/100 |
| 2011/0261099 A1 | 10/2011 | Miyashita et al. | |
| 2011/0261100 A1 | 10/2011 | Miyashita et al. | |
| 2012/0194614 A1 | 8/2012 | Marumoto | |

FOREIGN PATENT DOCUMENTS

| | | |
|---|---|---|
| JP | 2012-158148 A | 8/2012 |
| JP | 2013-028001 A | 2/2013 |

\* cited by examiner

LUT16A1

| R | G | B | C | M | Y | K | C+M+Y+K |
|---|---|---|---|---|---|---|---|
| 255 | 0 | 0 | 0 | 64 | 56 | 0 | 120 |
| 255 | 32 | 0 | 0 | 57 | 63 | 0 | 120 |
| 255 | 64 | 0 | 0 | 50 | 70 | 0 | 120 |
| 255 | 96 | 0 | 0 | 41 | 79 | 0 | 120 |
| 255 | 128 | 0 | 0 | 32 | 88 | 0 | 120 |
| 255 | 160 | 0 | 0 | 18 | 100 | 0 | 118 |
| 255 | 192 | 0 | 0 | 11 | 100 | 0 | 111 |
| 255 | 224 | 0 | 0 | 5 | 100 | 0 | 105 |
| 255 | 255 | 0 | 0 | 0 | 100 | 0 | 100 |
| 255 | 255 | 32 | 0 | 0 | 93 | 0 | 93 |
| 255 | 255 | 64 | 0 | 0 | 78 | 0 | 78 |
| 255 | 255 | 96 | 0 | 0 | 51 | 0 | 51 |
| 255 | 255 | 128 | 0 | 0 | 33 | 0 | 33 |
| 255 | 255 | 160 | 0 | 0 | 23 | 0 | 23 |
| 255 | 255 | 192 | 0 | 0 | 13 | 0 | 13 |
| 255 | 255 | 224 | 0 | 0 | 6 | 0 | 6 |
| 255 | 255 | 255 | 0 | 0 | 0 | 0 | 0 |
| MAX | | | 100 | 100 | 100 | 100 | 120 |

LUT16A2

| R | G | B | C | M | Y | K | C+M+Y+K |
|---|---|---|---|---|---|---|---|
| 255 | 0 | 0 | 0 | 78 | 72 | 0 | 150 |
| 255 | 32 | 0 | 0 | 70 | 80 | 0 | 150 |
| 255 | 64 | 0 | 0 | 61 | 89 | 0 | 150 |
| 255 | 96 | 0 | 0 | 52 | 98 | 0 | 150 |
| 255 | 128 | 0 | 0 | 35 | 100 | 0 | 135 |
| 255 | 160 | 0 | 0 | 22 | 100 | 0 | 122 |
| 255 | 192 | 0 | 0 | 13 | 100 | 0 | 113 |
| 255 | 224 | 0 | 0 | 6 | 100 | 0 | 106 |
| 255 | 255 | 0 | 0 | 0 | 100 | 0 | 100 |
| 255 | 255 | 32 | 0 | 0 | 93 | 0 | 93 |
| 255 | 255 | 64 | 0 | 0 | 78 | 0 | 78 |
| 255 | 255 | 96 | 0 | 0 | 51 | 0 | 51 |
| 255 | 255 | 128 | 0 | 0 | 33 | 0 | 33 |
| 255 | 255 | 160 | 0 | 0 | 23 | 0 | 23 |
| 255 | 255 | 192 | 0 | 0 | 13 | 0 | 13 |
| 255 | 255 | 224 | 0 | 0 | 6 | 0 | 6 |
| 255 | 255 | 255 | 0 | 0 | 0 | 0 | 0 |
| MAX | | | 100 | 100 | 100 | 100 | 150 |

Fig. 9

PRINTING DEVICE AND PRINTING METHOD FOR DISCHARGING INK FROM NOZZLE ROW INCLUDING NOZZLE GROUPS

CROSS-REFERENCE TO RELATED APPLICATIONS

This application claims priority to Japanese Patent Application No. 2014-112926 filed on May 30, 2014. The entire disclosure of Japanese Patent Application No. 2014-112926 is hereby incorporated herein by reference.

BACKGROUND

Technical Field

The present invention relates to a printing device and printing method.

Related Art

An inkjet printer as a printing device is equipped with a printing head which has nozzle rows formed with a plurality of nozzles for discharging ink aligned in a fixed direction.

As related technology, printing devices are known that print a pseudo band with main scan passes N times (N is a natural number) by moving the printing head in the sub scan direction for each of the main scan passes (see Unexamined Patent Publication No. 2011-235592). With Unexamined Patent Publication No. 2011-235592, the pseudo band is printed by printing odd numbered rows using eight nozzles with the first pass, moving print media in the sub scan direction by half the nozzle pitch, and printing even numbered rows using the same eight nozzles with the second pass.

The density of the ink discharged from each nozzle constituting a nozzle row (ink droplets) is preferably fixed and does not depend on the nozzles. This is because it is easy to visually recognize unevenness (color unevenness, density unevenness) in the printing results when there is a difference in density of the ink discharged for each nozzle. The inventors found out that it is easy for there to be a difference between the density of the ink discharged by nozzles positioned near the end of the nozzle row and the density of ink discharged by nozzles positioned near the center of the nozzle row. Based on this kind of knowledge, taking into consideration prior art such as Unexamined Patent Publication No. 2011-235592, within the pseudo band, an area for which printing is done only by nozzles near the ends, and areas for which printing is done only by nozzles near the center occur, so there remains the possibility of visually recognizing differences in concentration of the printing results between these areas as unevenness.

SUMMARY

The present invention was created in order to address at least the problems described above, and provides a printing device and printing method that makes it possible to inhibit unevenness in printing results, and to realize higher quality printing results.

One mode of the invention is a printing device including a printing head and a control unit. The printing head has a nozzle row on which are formed a plurality of nozzles aligned in a first direction and is configured to discharge ink. The nozzle row includes a one end side nozzle group which is a plurality of nozzles of one end side of the nozzle row, an other end side nozzle group which is a plurality of nozzles of an other end side of the nozzle row, and a center nozzle group which is a plurality of nozzles of the nozzle row and does not correspond to the one end side nozzle group and the other end side nozzle group. The control unit is configured to convey a print medium in the first direction, configured to move the printing head in a second direction that intersects the first direction, and configured to perform printing by discharging the ink from the nozzles onto the print medium during movement of the printing head. The control unit is configured to discharge the ink on a designated area on the print medium from the nozzles included in the center nozzle group and the other end side nozzle group with a first movement which is the movement, and configured to discharge the ink on the designated area from the nozzles included in the center nozzle group and the one end side nozzle group with a second movement which is the movement the next time after the first movement.

With this configuration, with the designated area as a unit area, the print medium is printed by the printing head moving a plurality of times (the plurality of times of movements includes the first movement and the second movement). At this time, during the first movement, of the nozzle rows, the nozzles included in the center nozzle group and the other end side nozzle group have ink discharged onto the unit area, and during the second movement which is the movement the next time, of the nozzle rows, the nozzles included in the center nozzle group and the one end side nozzle group have ink discharged on the same unit area. Therefore, in one unit area, there is no concentration of areas for which printing is done only by the nozzles of the one end side nozzle group or the other end side nozzle group, or of areas for which printing is done only by the nozzles of the center group, and as a result, the kind of unevenness described above does not occur easily.

With one mode of the invention, it is also possible for the printing device to include an ink volume determining unit configured to, by referencing a color conversion table for converting a color system used by image data that expresses an image to a color system of the ink discharged by the printing head, determine an ink volume within a designated upper limit value for each pixel of the image data. The discharge control unit is configured to control discharging of the ink by the nozzles by allocating to the nozzles pixels for which discharge or non-discharge of the ink has been determined based on the ink volume. When the ink volume determining unit, among a pre-defined first color conversion table using a first upper limit value for the upper limit value, and a pre-defined second color conversion table using a second upper limit value higher than the first upper limit value for the upper limit value, references the pre-defined second color conversion table to determine the ink volume, the discharge control unit is configured to allocate pixels to the nozzles included in the center nozzle group and the other end side nozzle group in correspondence to the first movement, and allocate pixels to the nozzles included in the center nozzle group and the one end side nozzle group in correspondence to the second movement. When the ink volume determining unit references the first color conversion table to determine the ink volume, the discharge control unit is configured to allocate pixels to the nozzles included in the one end side nozzle group, the center nozzle group, and the other end side nozzle group respectively in correspondence to each time of the movement.

With that constitution, when conditions are established for which the unevenness occurs easily (when the ink volume is determined by referencing the second color conversion table that uses a second upper limit value that is relatively high as the upper limit value noted above), the unevenness is suppressed by taking measures to differentiate the nozzles that discharge ink respectively with the kind of first and second movements described above. On the other hand, when conditions are established for which the unevenness does not occur easily (when the ink volume is determined by referencing the first color conversion table that uses a first upper limit value that is relatively low as the upper limit value noted above), measures are not taken to differentiate the nozzles that discharge the ink for each movement time, and the overall printing speed is increased.

With one mode of the invention, it is also possible for the discharge control unit to print a raster line expressed by ink droplets being aligned in the second direction by discharging the ink from the nozzles during one time of the movement.

With that constitution, it is possible to increase the printing speed compared to when printing one raster line using a plurality of movements.

With one mode of the invention, it is also possible that a ratio of a nozzle count of the nozzle row occupied by a nozzle count of the center nozzle group and the other end side nozzle group, and a ratio of the nozzle count of the nozzle row occupied by a nozzle count of the center nozzle group and the one end side nozzle group are 3/5 or greater and 3/4 or less.

By using this kind of ratio, it is possible to accurately prevent the occurrence of areas for which printing is done only by nozzles that are inclined in the same way to have the density of the discharged ink be in either of a dense state or a thin state.

With one mode of the invention, it is also possible to be a printing device configured to convey a print medium in a first direction, configured to move a printing head, which has nozzle row on which are formed a plurality of nozzles aligned in the first direction and configured to discharge ink, in a second direction that intersects the first direction, and configured to perform printing by discharging the ink from the nozzles onto the print medium during movement of the printing head, the nozzle row being constituted such that the nozzle row is segmented into a plurality of segments along the first direction, and a color of the ink discharged by the nozzles is differentiated for each of the segments. The printing device includes a discharge control unit configured to, with a first movement which is the movement, among a one end side nozzle group using a plurality of nozzles of one end side of the nozzle row of each of the segments, an other end side nozzle group using a plurality of nozzles of an other end side of the nozzle row of each of the segments, and a center nozzle group using a plurality of nozzles of the nozzle row that do not correspond to the one end side nozzle group and the other end side nozzle group of each of the segments, discharge the ink on a designated area on the print medium from the nozzles included in the center nozzle group and the other end side nozzle group of each of the segments, and with a second movement which is the movement the next time after the first movement, discharge the ink to the designated area from the nozzles included in the center nozzle group and the one end side nozzle group of each of the segments.

With that constitution, for all the ink colors corresponding to the segments, having the occurrence of a concentration of areas printing only with nozzles of the one end side nozzle group or the other end side nozzle group, and the occurrence of a concentration of areas printing only with nozzles of the center nozzle group is prevented, and it is possible to prevent the occurrence of the kind of unevenness described above.

It is also possible that the nozzle row is divided into a segment for which the nozzles discharge cyan ink, a segment for which the nozzles discharge magenta ink, and a segment for which the nozzles discharge yellow ink.

With one mode of the invention, it is also possible for pigment ink to be used as the ink.

Compared to dye inks, pigment inks have shading differences of the ink for each nozzle occur more easily. However, with the present invention, by taking measures to differentiate the nozzles that discharge the ink respectively with the first and second movements as described above, because unevenness is suppressed by the difference in shading of the ink of each nozzle, it is possible to effectively improve the quality even when using pigment ink.

With one mode of the invention, it is also possible that the printing head is configured to receive supply of the ink to the nozzles from an ink cartridge that holds ink using a sponge like material.

When the ink supplied to the nozzle is filled in the ink cartridge that holds ink using a sponge like material, it is easy to have sedimentation of the colorant occur within the cartridge. When ink is supplied to each nozzle from a cartridge filled with ink for which the colorant is in a sedimentation state in this way, it is easy for differences in shading to occur for the ink of each nozzle. However, with the present invention, as described above, by taking measures to differentiate the nozzles discharging ink respectively with the first and second movements, unevenness due to the differences in the shading of the ink for each nozzle is suppressed, so it is possible to effectively improve the image quality even when using the kind of ink cartridge described above.

The technical concept of the invention is not realized only by the printing device described above. For example, it is also possible to regard a method equipped with the processing steps executed by each part of the printing device (printing method) as one invention. The present invention can also be realized in various categories, such as a computer program by which each step of this kind of method is executed on hardware (computer), or also a computer readable storage medium on which that program is recorded.

BRIEF DESCRIPTION OF THE DRAWINGS

Referring now to the attached drawings which form a part of this original disclosure:

FIG. 2 is a drawing showing a simple example of the printing head configuration and the like;

FIG. 3 is a drawing simply showing another printing head configuration or the like;

FIG. 9 is a drawing showing an example of a color conversion LUT.

DETAILED DESCRIPTION OF EXEMPLARY EMBODIMENTS

Embodiments of the present invention will be described according to the following sequence.

1. Device Configuration Overview
2. First Embodiment
3. Second Embodiment
4. Modification Examples

1. Device Configuration Overview

Figure 1:
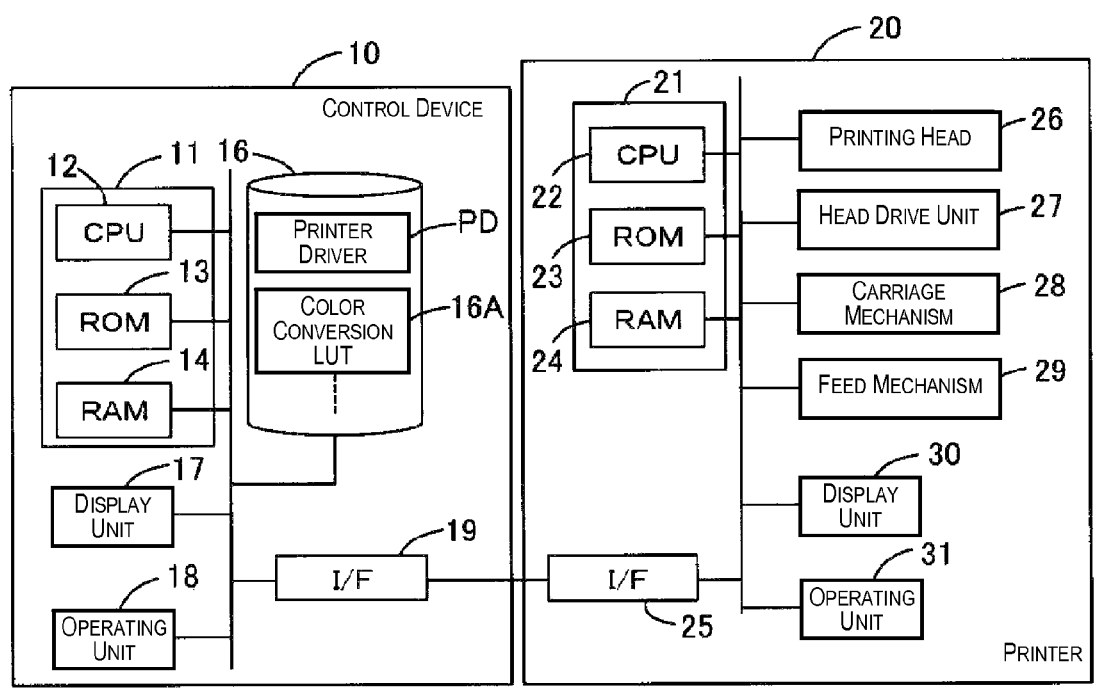
FIG. 1 is a drawing schematically showing the device configuration of this embodiment.

FIG. 1 schematically shows the configuration of a printing system 1 of this embodiment. The printing system 1 includes a printer 20 (example of a printing device), and a control device 10 for controlling the printer 20. The control device 10 is a device in which is installed a program for controlling the printer 20. The control device 10 is typically a desktop or laptop type personal computer (PC), but it can also be a tablet type terminal, a mobile terminal or the like.

Alternatively, the control device 10, the printer 20 or the like constituting the printing system 1 can also be separate devices connected to be able to communicate, or they can be constituted as one consolidated product. For example, the printer 20 can also include a control device 10 as a part of the machine body. In this case, the printer 20 that includes the control device inside the machine body correlates to the printing system 1 or the printing device, and is the main unit for executing the printing method. Also, the printer 20 that correlates to the printing system 1 or the printing device can also be a compound machine that functions also as a scanner, fax machine or the like. Also, the printing system 1 or the printing device can also be called a printing control system, a printing control device or the like.

With the control device 10, the CPU 12 that forms the core of the arithmetic processing controls the overall control device 10 via a system bus. Connected to this bus are a ROM 13, a RAM 14, and various types of interfaces (I/F) 19, and as a storage means, for example a hard disk drive (HDD) 16 is connected. However, the storage means can also be semiconductor memory or the like. An operating system, application programs, printer driver PD and the like are stored in the storage means (HDD 16), and these programs are read as appropriate by the CPU 12 on the RAM 14 and executed. The CPU 12, ROM 13, and RAM 14 are collectively referred to as a control unit 11. A color conversion lookup table (LUT) 16 or the like can also be stored in the storage means.

The I/F 19 is connected with the printer 20 with wires or wirelessly. Furthermore, the control device 10 is equipped with a display unit 17 constituted by a liquid crystal display, for example, an operating unit 18 or the like constituted for example by a keyboard, mouse, touch pad, touch panel or the like.

The items we described as the items executed by the control device 10 with this embodiment can also have respectively all or a portion executed according to a designated program by a control unit 21 on the printer 20 side. Also, the information held by the control device 10 such as the color conversion LUT 16A or the like can be held on the printer 20 side.

With the printer 20, the I/F 25 is connected to be able to communicate with the control device 10 side I/F 19 with wires or wirelessly, and the control unit 21 and the like is connected via a system bus. With the control unit 21, the CPU 22 reads the programs (firmware and the like) stored in the ROM 23 or the like as appropriate to the RAM 24 and executes designated arithmetic processing. The control unit 21 is connected to each unit including a printing head 26, a head drive unit 27, a carriage mechanism 28, and a feed mechanism 29, and controls each unit.

The printing head 26 receives supply of various types of ink from cartridges for each of the plurality of types of liquids (e.g. cyan (C) ink, magenta (M) ink, yellow (Y) ink, black (K) ink and the like). The printing head 26 can spray (discharge) ink from a plurality of nozzles provided corresponding to each type of ink. Of course, the specific types and number of liquids used by the printer 20 are not limited to the items described above, and for example, it is possible to use various types of inks such as light cyan, light magenta, orange, green, gray, light gray, white, metallic or the like inks, or liquids other than ink such as a pre-coating liquid or the like.

The carriage mechanism 28 is controlled by the control unit 21, and a carriage (not illustrated) that the printer 20 is equipped with is moved from one end side of the main scan direction to the other end side (and/or from the other end side to the one end side) along a designated direction (main scan direction). The printing head 26 is mounted on the carriage, and the printing head 26 performs that movement using the carriage.

Figure 2:
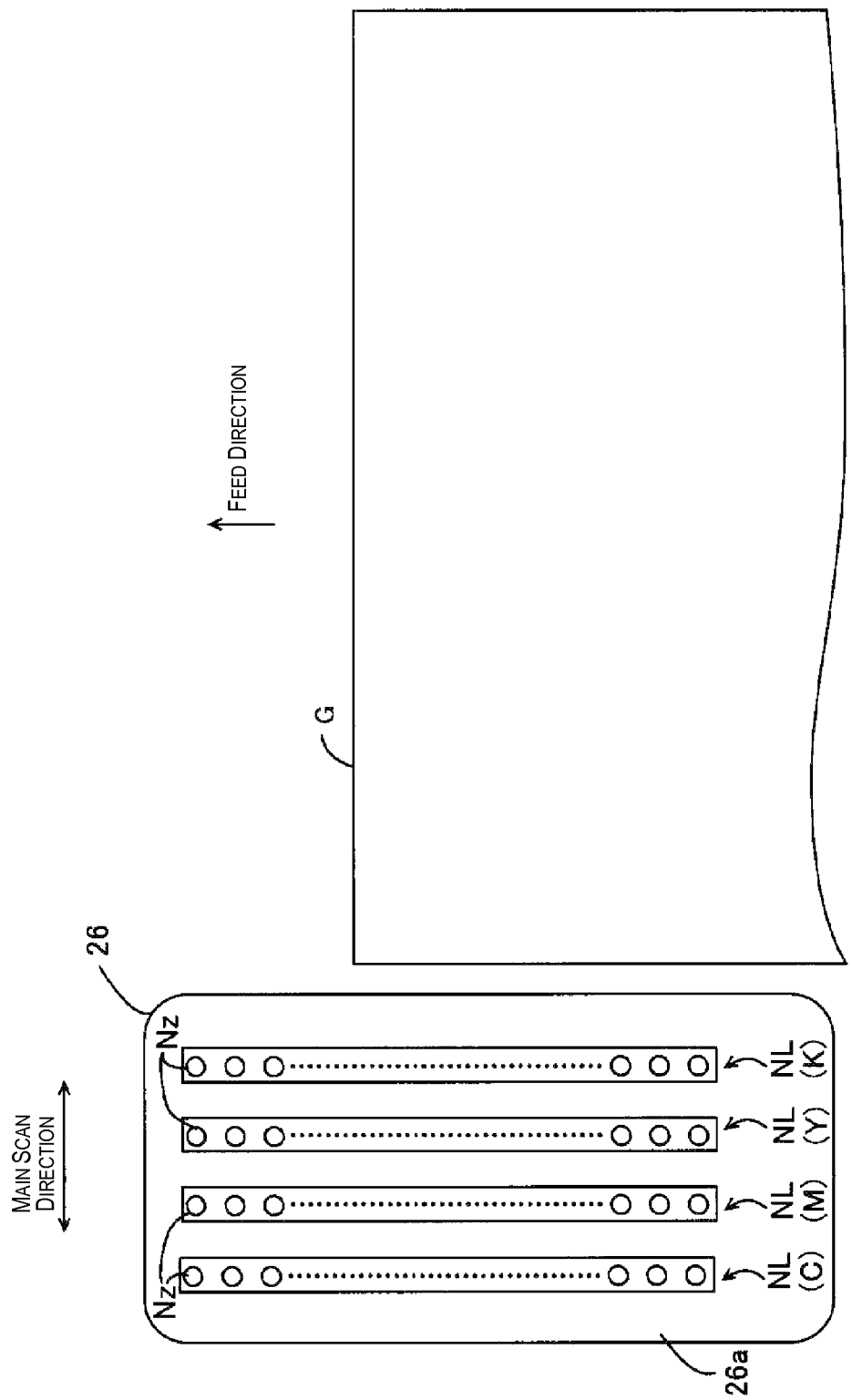
Figure 3:
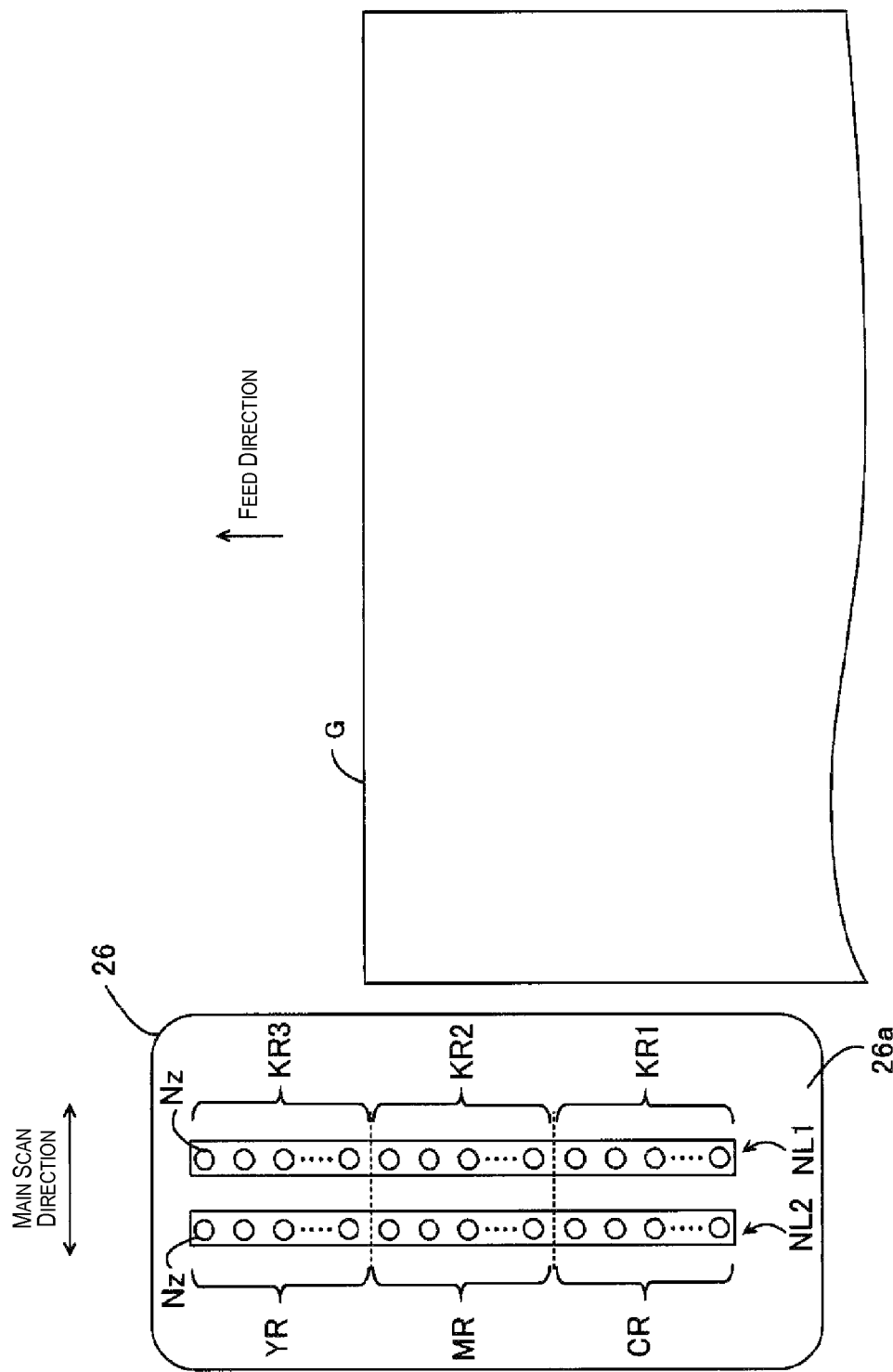

The feed mechanism 29 is controlled by the control unit 21, and conveys a print medium using a roller or the like (not illustrated) in a feed direction that intersects (orthogonally) the main scan direction (see the print medium G in FIGS. 2 and 3). The feed direction correlates to the "first direction," and the main scan direction correlates to the "second direction." Also, the feed direction can also be called the sub scan direction.

The head drive unit 27 generates drive voltage for driving piezo electric devices provided corresponding to each nozzle of the printing head 26 based on the print data (print data will be described later) fetched by the control unit 21 from the control device 10 via the I/F 25. The head drive unit 27 outputs that drive voltage to the printing head 26. The piezo electric devices are deformed when that drive voltage is applied, and liquid is discharged from the corresponding nozzle. By doing this, ink (ink droplets) for each of the ink types is discharged from each nozzle to the print medium by the printing head 26 that is being moved by the carriage. The discharged ink adheres to the print medium, and by "dots" being formed on the surface of the print medium, an image is reproduced on the print medium based on the print data. Dots indicate ink in a state impacted on the print medium. However, even at the stage before the ink has impacted the print medium, there are cases when the expression "dots" is used for convenience of explanation.

The material used as print medium is typically paper, but in addition to paper it is also possible to use various materials including fiber, plastic, metal, and other natural materials or synthetic materials.

The printing head 26 movement from the one end side to the other end side of the main scan direction, or the movement from the other end side to the one end side of the main scan direction is also called the main scan or a pass. The printing head 26 first time movement from the one end side to the other end side of the main scan direction, or the first time movement from the other end side to the one end side of the main scan direction is the first time main scan (first pass), and the unit of both the "first movement" and "second movement" of the present invention is one main scan (one pass).

Furthermore, the printer 20 is equipped with a display unit 30 constituted by a liquid crystal display, for example, and an operating unit 31 constituted by buttons, a touch panel or the like. With the printer 20, the means for discharging ink droplets from the nozzles is not limited to being a piezo electric device, and it is also possible to use a means that discharges ink droplets from the nozzles by heating ink using a heater element.

FIG. 2 shows a simple example of the positional relationship of the printing head 26 and the conveyed print medium G with the printer 20. At the left side of FIG. 2 is shown an example of an array of nozzles Nz on an ink discharge surface 26a of the printing head 26. The ink discharge surface 26a is the surface at which the nozzles Nz open, and is the surface that the print medium G faces opposite when the printing head 26 does the main scan. The printing head 26 has a nozzle row NL for each discharged ink color (e.g. CMYK). The nozzle row is a row for which nozzles are aligned at equal intervals along the feed direction, and with the example in FIG. 2, nozzle rows NL are in a four-row parallel state with rows aligned in the main scan direction. With FIG. 2, an example of the colors of ink discharged by each nozzle row NL are noted for reference in parentheses. However, aside from one color of ink being discharged by one nozzle row NL, for example, it is also possible to have discharging done by a plurality of nozzle rows NL arranged skewed to each other in the feed direction. With this specification, for the direction, position and the like of each constitution, even when expressed as orthogonal, equal intervals, parallel and the like, these do not mean only strictly orthogonal, equal intervals, and parallel, but rather the meaning also includes a level of deviation allowed in terms of product function, and a level of deviation that can occur during product manufacturing.

FIG. 3 shows a simple example of the positional relationship of the printing head 26 which differs from the printing head 26 shown in FIG. 2, and the conveyed printing media G. The ink discharge surface 26a of the printing head 26 shown in FIG. 3 has a nozzle row NL1 formed by a plurality of nozzles Nz for discharging black ink (Knozzle) aligned in the feed direction, and a nozzle row NL2 formed by a plurality of nozzles Nz for discharging CMY ink as the colored (chromatic color) inks aligned in the feed direction. The nozzle row NL1 and the nozzle row NL2 are aligned in a row in the main scan direction in a state parallel to each other.

The nozzle row NL2 shown in FIG. 3 is divided into a plurality of segments along the feed direction, and has a constitution for which the color of ink discharged by the nozzles Nz for each segment is different. In specific terms, the nozzle row NL2 includes a segment (first segment CR) for which a plurality of nozzles Nz for discharging C ink (Cnozzle) are aligned in the feed direction, a segment (second segment MR) for which a plurality of nozzles Nz for discharging M ink (Mnozzle) are aligned in the feed direction, and a segment (third segment YR) for which a plurality of nozzles Nz for discharging Y ink (Ynozzle) are aligned in the feed direction. Said another way, the nozzle groups for discharging a specific color ink each (first segment CR, second segment MR, and third segment YR) are respectively formed mutually skewed in their row connection direction, constituting overall the nozzle row NL2.

The nozzle row NL1 shown in FIG. 3 is divided into areas that form a pair respectively with the first segment CR, the second segment MR, and the third segment YR. Here, "form a pair" means the relationship of being housed in the same range in the feed direction. For example, the range forming a pair with the first segment CR that is a part of the nozzle row NL1 is called first segment KR1, the range forming a pair with the second segment MR that is a part of the nozzle row NL1 is called second segment MR2, and the range forming a pair with the third segment YR that is a part of the nozzle row NL1 is called third segment YR3. The first segment CR, the second segment MR, the third segment YR, the first segment KR1, the second segment KR2, and the third segment KR3 respectively have the same number of nozzles Nz. The density (nozzles/inch, npi) for the respective nozzle rows shown in FIGS. 2 and 3 (NL, NL1, NL2) is, for example, half of the print resolution (dots/inch, dpi) of the feed direction by the printer 20.

Figure 4:
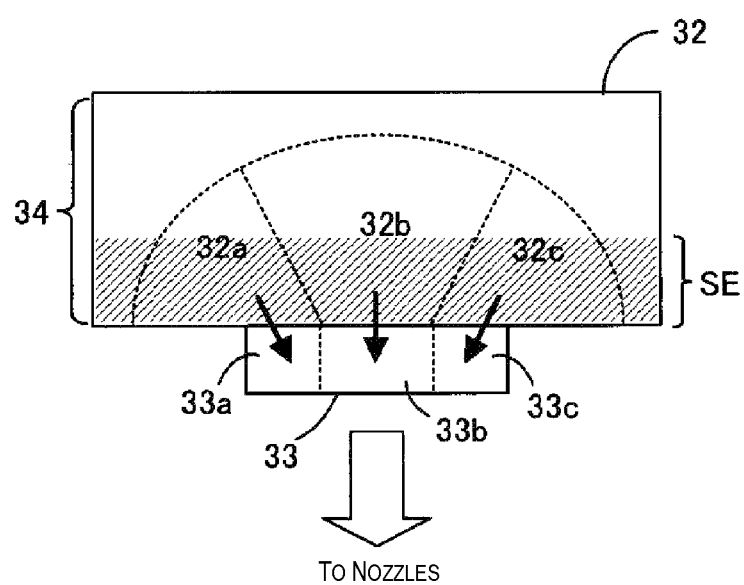
FIG. 4 is a drawing simply showing the configuration of an ink cartridge.

FIG. 4 shows a simple example of the constitution of the cartridge (ink cartridge) that the printer 20 has. The cartridge 32 is, for example, the cartridge filled with C ink. The cartridges respectively filled with the other colors of ink (MYK ink) also basically have the same constitution as that of the cartridge 32. Inside the cartridge 32, a sponge type material (absorption member 34) is packed, and the ink is filled inside the cartridge 32 in a state absorbed (held) in this kind of absorption member 34. The absorption member 34 is also called a foam material or the like. The cartridge 32 is in communication with a supply port 33. The supply port 33 is in communication with a flow path for supplying ink (not illustrated) formed inside the printing head 26, and ink is supplied via the supply port 33 and that flow path from the cartridge 32 to the nozzle rows of the printing head 26 (each nozzle constituting the nozzle row).

With FIG. 4, an example is shown with hatching implemented as the sedimentation range SE for a partial range within the cartridge 32. The sedimentation range SE means a range in which colorant within that ink is greatly biased (sedimented). Though it also depends on the storage state of the cartridge 32, with the ink held in the absorption member 34, the colorant within the ink is sedimented in a certain direction, and because of that, the density of the color of the ink within the cartridge 32 is not fixed. For example, if the cartridge 32 is stored with the supply port 33 facing downward (gravity direction side), as with the example shown in FIG. 4, the range for a certain level of the supply port 33 side becomes the sedimentation range SE. In particular, when the ink is pigment ink, compared to dye ink, the colorant (pigment) has larger particles, and dissolves in water less easily, so sedimentation like that described above occurs easily. With this embodiment, the ink discharged by the printing head 26 can be either pigment ink or dye ink, but hereafter, we will continue to describe it as pigment ink. Also, with the mode of holding ink using the absorption member 34, even when vibration is applied to the cartridge 32, the ink within the cartridge 32 is almost not stirred at all, so once a sedimentation state has occurred, it hardly disappears at all.

Here, when the supply port 33 is divided roughly into a center vicinity area 33b, and areas 33a and 33c at both sides of that, ink is supplied to these areas 33a, 33b, and 33c from each area 32a, 32b, and 32c that exist when the inside of the cartridge 32 is divided roughly into a fan shape as shown by the example in FIG. 4. In other words, to the center vicinity area 33b of the supply port, most ink flows from the center vicinity area 32b within the cartridge 32, to the area 33a of one end side of the supply port 33, ink mainly flows from the end side area 32a for which the position corresponds within the cartridge 32, and to the area 33c of the other end side of the supply port 33, ink mainly flows from the area 32c of the end side for which the position within the cartridge 32 corresponds. Of course, this does not mean that the supply port 33 is actually partitioned into areas 33a, 33b, and 33c, and similarly, does not mean that the inside of the cartridge 32 is partitioned into areas 32a, 32b, and 32c. However, since ink is hardly stirred at all on the inside of the cartridge 32 for which ink is held by the absorption member 34, this kind of correlation between the areas 33a, 33b, and 33c of the supply port 33 and the areas 32a, 32b, and 32b within the cartridge 32 that supplies ink to the areas 33a, 33b, and 33c is almost totally maintained.

As can be understood from the example in FIG. 4, the areas 32a and 32c of the end sides within the cartridge 32 have a greater portion belonging to the sedimentation range SE compared to the center area 32b. Therefore, we can see a tendency for the density of the ink that passes through the areas 33a and 33c of the end sides of the supply port 33 to be denser than the density of the ink that passes through the center area 33b of the supply port 33. This kind of density difference of the ink that passes through the supply port 33 is linked to the density difference of the ink that is finally discharged by each nozzle constituting the nozzle row. In other words, with the nozzle row that receives the supply of ink from the cartridge 32, the density of the ink discharged from the nozzles positioned at the end sides of the nozzle row is in a denser state than the density of the ink discharged from the nozzles positioned near the center of the nozzle row.

Between the supply port 33 and the nozzles, a flow path is interposed as described above. Therefore, it is thought that the ink is stirred to some degree in the space from the supply port 33 to the nozzles. However, in a state with ink flowing at a flow rate of a certain degree or above within the flow path, stirring of the ink within the flow path is inhibited. Because of that, as a result, the density difference between the center (area 33b) and the ends (areas 33a, 33c) when the ink passes through the supply port 33 has a tendency to appear in the density difference of the ink discharged from the center (nozzles positioned near the center of the nozzle row) and the ends (nozzles positioned at the end sides of the nozzle row) with the nozzle row that the ink finally reaches. Depending on the sedimentation state of the ink within the cartridge 32, the density of the ink that passes through the areas 33a and 33c of the end sides of the supply port 33 may be thinner than the density of the ink that passes through the area 33b of the center of the supply port 33, and as a result, at the nozzle row that receives the supply of ink from the cartridge 32, the density of the ink discharged from the nozzles positioned at the end side of the nozzle row may be thinner than the density of the ink discharged from the nozzles positioned near the center of the nozzle row.

In any case, the inventors found that with the sedimentation described above, with a nozzle row constituted by a plurality of nozzles discharging the same color ink, the density of the discharged ink differs according to the position of the nozzle. Based on this kind of knowledge, with this embodiment, a mechanism is implemented to eliminate unevenness due to the difference in density of the ink discharged by the nozzles.

2. First Embodiment

Based on the constitution described above, we will describe the first embodiment. With the first embodiment, we will give a description with the printer 20 having the printing head 26 of the mode shown in FIG. 2.

Figure 5:
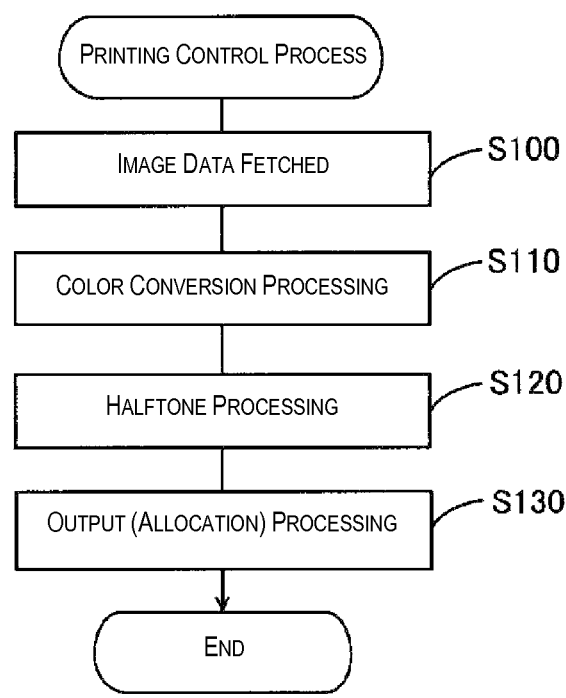
FIG. 5 is a flow chart showing the printing control process.

FIG. 5 is a flow chart showing the process of the control device 10 having printing executed by the printer 20 according to the printer driver PD (printing control process).

At step S100, the control unit 11 fetches image data freely selected by the user from a designated input source. The user is able to freely select image data expressing an image he wishes to print on the print medium by operating the operating unit 18 or the like while visually confirming the user interface screen (UI screen) displayed on the display unit 17 or the like. The input source of the image data is not particularly limited, but for example, applicable items include the HDD 16, a memory card (not illustrated) inserted from outside into the control device 10 or the printer 20 or the like, as well as various types of image input devices connected to be able to communicate with the control device 10.

The image data fetched at step S100 is in bitmap format, for example, and is RGB data that expresses the density of the element colors of R (red), G (green), and B (blue) for each pixel in gradations (e.g. 256 gradations of 0 to 255). Also, when the fetched image data is not compatible with this kind of RGB color system, the control unit 11 converts the fetched image data to data of that color system. Furthermore, the control unit 11 implements as appropriate resolution conversion processing or the like on the image data to match the print resolution of the printer 20 main scan direction and the feed direction.

At step S110, the control unit 11 executes color conversion processing with the image data after step S100 as the subject. In other words, the color system using the image data is converted to the ink color system (e.g. CMYK) used for printing by the printer 20. Color conversion processing is executed for each pixel by referencing the color conversion LUT 16A which defines the conversion relationship of the color systems in advance. When the colors of each pixel are expressed in gradations with RGB by the image data as described above, the RGB gradation values of each pixel are converted to ink volume for each of CMYK. This kind of CMYK value after color conversion can be expressed in levels with numerical values of 0 to 100%, and can be said to be the gradation expression of the ink volume (density) for the corresponding pixel. The density of the ink shown by the ink volume as gradation values obtained with step S110 is the density of each pixel and of each ink color necessary for reproducing an image, and is unrelated to the density due to sedimentation described with the example in FIG. 4 (density difference within the same ink that exists in reality). At the point of executing the processing of the step S110, the control unit 11 can be said to be functioning as the ink volume determining unit.

At step S120, the control unit 11 implements halftone processing on the image data after step S110 (ink volume data) and converts it to print data. The control unit 11, for example, can execute halftone processing using dithering that uses a dither mask defined in advance, or can execute halftone processing using the error diffusion method. With halftone processing, for each pixel, print data (dot data) is generated that defines the discharge (with dots) or without discharge (without dots) for each color of CMYK ink. In this case, the higher the value of the ink volume defined by a certain pixel with the ink volume data, as a result of halftone processing, the higher the possibility that ink discharge will be determined for that pixel.

At step S130, the control unit 11 realigns the pixels constituting the print data (dot data) generated at step S120 in the sequence to be transferred to the printing head 26 according to a designated rule for allocation to nozzles. By this realignment processing, the dots stipulated by the pixels constituting the print data are set in terms of at which number pass, at what timing within the pass to be discharged by which of the nozzles within the printing head 26 according to that pixel position and ink color. The print data after the realignment processing according to that designated rule for allocation is output to the printer 20 side according to the sequence after that realignment via the I/F 19 (output process). By doing this, the pixels constituting the print data are essentially allocated to one of the nozzles that the printing head 26 has.

The printer 20 controls the main scan (pass) of the printing head 26, whether to discharge or not discharge ink from each nozzle, and feeding of the print medium based on the print data input via the I/F 25, and prints on the print medium the image expressed by the image data fetched at step S100.

At the point that these kinds of processing of steps S120 and S130 are executed, by allocating to the nozzles pixels for which ink discharge and non-discharge has been determined, the control unit 11 can be said to be functioning as the discharge control unit that controls the discharge of ink by the nozzles. "Allocating to the nozzles pixels" does not guarantee actual use of the nozzle (action of the nozzle discharging ink). Whether or not a nozzle discharges ink is according to whether or not the pixel allocated to the nozzle is a "with dots" pixel. However, it is possible to do a simple interpretation of a prerequisite that if the pixel allocated to the nozzle is a with dots pixel, having the pixel allocated to the nozzle means that ink for expressing that pixel will be discharged from that allocated nozzle.

With this embodiment, the designated rule for allocation includes at least the rule that, with the primary pass that is the first pass (first movement), among the one end side nozzle group using the plurality of nozzles at one end side of the nozzle row, the other end side nozzle group using the plurality of nozzles of the other end side of that nozzle row, and the center nozzle group using the plurality of nozzles of that nozzle row that do not correspond to either the one end side nozzle group or the other end side nozzle group, ink is discharged on a designated area on the print medium from the nozzles included in the center nozzle group and the other end side nozzle group, and that with the second pass (second movement) that is the next pass after the primary pass, ink is discharged on the designated area from the nozzles included in the center nozzle group and the one end side nozzle group.

We will give a detailed description of the process of allocating pixels to nozzles at step S130.

Figure 6:
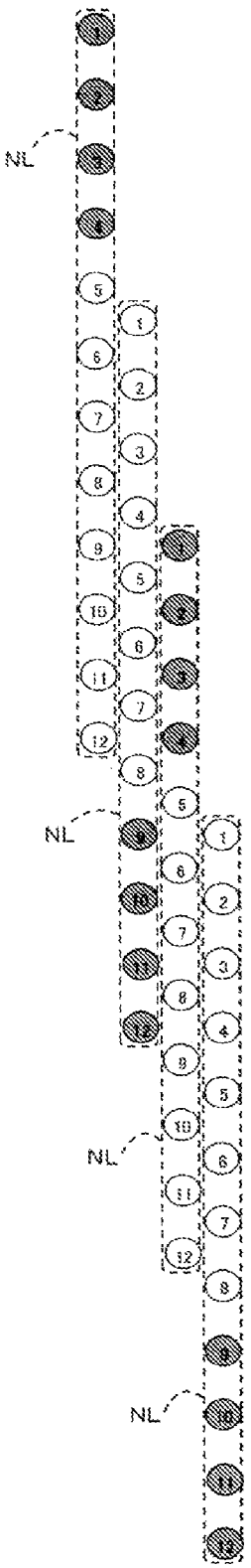
FIG. 6 is a drawing showing an example of the relationship of the allocation of pixels and nozzles with the first embodiment.

FIG. 6 is a drawing for describing the corresponding relationship of the nozzles that constitute the nozzle row NL and the pixels that constitute the image data IM allocated to the nozzles. The corresponding relationship between the nozzles and the pixels shown in FIG. 6 is nothing more than an example, and this kind of corresponding relationship changes according to the printing method used by the printer 20. At the left side of FIG. 6, to make the description simple, shown is an example with the nozzle row NL (dotted line frame) corresponding to one ink color constituted by 12 nozzles (circles). The numbers 1 through 12 marked in the center of the circles showing the nozzles along the lengthwise direction of the nozzle row NL are the nozzle numbers. Also, in FIG. 6, shown is changing of the position (relative position of the print medium in the feed direction) of one nozzle row LN for each pass by the printing head 26 (first time pass, second time pass, third time pass, fourth time pass, . . . ). In actuality, the printing head 26 does not move in the feed direction, and each time a pass ends, the print medium is moved in the feed direction by a designated feed volume (see the feed volume noted together with the pass number in FIG. 6) by the feed mechanism 29.

At the right side of FIG. 6, a part of the image data IM is shown by example by the collection of a plurality of pixels (rectangles) arranged in the X direction (corresponding to the main scan direction) and the Y direction (corresponding to the feed direction). With the image data IM, the respective resolutions in the X direction and the Y direction correspond to the respective print resolutions of the main scan direction and the feed direction used by the printer 20 (e.g. 720 dpi×720 dpi). In FIG. 5, at the outside of the image data IM, numbers 1, 2, 3 . . . given respectively in the X direction and the Y direction indicate the position of each pixel for the image data IM (X, Y coordinates). The image data IM shown here indicates the print data (dot data) described above, but this can also be interpreted as being the image data before color conversion processing (RGB data) or the image data after color conversion processing (ink volume data). In FIG. 6, the numbers within the rectangles indicating pixels mean the "nozzle number/pass number" for which the pixels are allocated. For example, the pixel shown by "5/1" is the pixel allocated to the fifth nozzle of the first pass.

The nozzle density of the nozzle row LN as described above is half the print resolution of the feed direction (e.g. 360 npi). The unit of the feed volume shown in FIG. 6 is the dot pitch of the feed direction. The dot pitch of the feed direction is equal to the length of one dot in the feed direction determined according to the print resolution of the feed direction. Because of that, by having the feed volume of the print medium each time one pass ends be an odd numbered multiple of the dot pitch, the resulting print resolution of the feed direction is 720 dpi. Also, with the example in FIG. 6, a printing method is shown by which the printing head 26 completes printing of one "pixel row" with one pass. With this embodiment, the pixel row means the area for which pixels with the same Y coordinate are strung from one end to the other end of the image data in the X direction. One pixel row represents one raster line parallel to the main scan direction (one raster line expressed with ink droplets aligned in the second direction). When the resolution of the image data IM in the X direction is 720 dpi as described above, the printing head 26 has the capacity to have the print resolution of the main scan direction with one pass be 720 dpi.

At step S130, the control unit 11 allocates each of the pixels constituting the image data IM to one of the nozzles based on the printing method already set for the printer 20. The printing method noted here is the action of the printer 20 determined according to the feed volume of the print medium each time one pass described above ends (see FIG. 6), the number of passes necessary to print one pixel row (one time), the designated rule for allocation and the like. Here, with the example of FIG. 6, the fifth to eighth nozzles of the nozzle row NL correlate to the center nozzle group, the first to fourth nozzles and the ninth to twelfth nozzles each correlate one to the one end side nozzle group and the other to the other end side nozzle group. In other words, three nozzle groups of the nozzles of the nozzle row NL roughly divided equally into three along the lengthwise direction of the nozzle row are used as the one end side nozzle group, the center nozzle group, and the other end side nozzle group.

However, the respective nozzle counts of the one end side nozzle group, the center nozzle group, and the other end side nozzle group are not limited to having to be completely matching. For example, when several unused nozzles each not used with actual printing exist at both ends of the nozzle row NL, and it is interpreted that the unused nozzles are part of the one end side nozzle group or the other end side nozzle group, the nozzle count of the one end side nozzle group or the nozzle count of the other end side nozzle group may become greater than the nozzle count of the center nozzle group. Also, while having the nozzle count of the one end side nozzle group and the nozzle count of the other end side nozzle group be the same number, it is possible to have the nozzle count of the center nozzle group be greater than the nozzle count of the one end side nozzle group (=nozzle count of the other end side nozzle group). In any case, the occupation rate of the nozzle count of the total of the center nozzle group and the other end side nozzle group of the nozzle count of the nozzle row NL, and the occupation rate of the nozzle count of the total of the center nozzle group and the one end side nozzle group of the nozzle count of the nozzle row NL are most ideally 2/3, but can also be in a range of 3/5 or greater and 3/4or less.

The results of allocation of each pixel to the nozzles with step S130 is shown in image data IM at the right side of FIG. 6. In specific terms, the pixels constituting the odd numbered pixel rows (pixel rows with Y=1, 3, 5, 7, 9, 11, 13, 15) of the pixel rows Y=1 to 16 are allocated to each nozzle constituting the center nozzle group and the other end side nozzle group (fifth, sixth, seventh, eighth, ninth, tenth, eleventh, and twelfth nozzles) of the first pass (primary pass), and the pixels constituting the even numbered pixel rows (pixel rows with Y=2, 4, 6, 8, 10, 12, 14, 16) of the Y=1 to 16 pixel rows are allocated to the nozzles (first, second, third, fourth, fifth, sixth, seventh, and eighth nozzles) constituting the one end side nozzle group and the center nozzle group of the second pass (the secondary pass when the first pass was the primary pass). Also, the pixels constituting the odd numbered pixel rows (pixel rows with Y=17, 19, 21, 23, 25, 27, 29, 31) of the Y=17 to 32 pixel rows are allocated to the nozzles constituting the center nozzle group and the other end side nozzle group (fifth, sixth, seventh, eighth, ninth, tenth, eleventh, and twelfth nozzles) of the third pass (primary pass), and the even numbered pixel rows (pixel rows with Y=18, 20, 22, 24, 26, 28, 30, and 32) of the Y=17 to 32 pixel rows are allocated to the nozzles constituting the one end side nozzle group and the center nozzle group (first, second, third, fourth, fifth, sixth, seventh, and eighth nozzles) of the fourth pass (when the third pass is the primary pass, the secondary pass). With FIG. 6, the nozzles for which pixels are not allocated with each pass are represented by a gray color.

According to the example in FIG. 6, an image constituted by 16 rows of pixel rows (Y=1 to 16 pixel row bundle and Y=17 to 32 pixel row bundle) is the unit image correlating to the designated area (band area, or pseudo band area) on the print medium printed each by a total of two passes. In other words, with the example of FIG. 6, of the primary pass and the secondary pass for printing the unit image, with the primary pass (first pass, third pass, . . . ), only the center nozzle group and the other end side nozzle group nozzles are used, and with the next secondary pass (second pass, fourth pass, . . . ), only the one end side nozzle group and the center nozzle group nozzles are used. This kind of allocation is repeated for each unit image. The nozzle row NL shown in FIG. 6 is the nozzle row for discharging C ink, for example, but for the nozzle rows NL respectively for the other ink colors MYK (FIG. 2) as well, allocation of the image data IM pixels and the nozzles is done in the same manner.

We will describe the effect of the first embodiment. Due to the sedimentation of ink inside the cartridge 32 described above, a difference occurs in the density even with the same color ink between the nozzle row end side nozzles (nozzles of the one end side nozzle group and the other end side nozzle group) and the nozzles near the center of the nozzle row (nozzles of the center nozzle group). However, with the first embodiment, for each unit area on the print medium, when performing printing with a plurality of (two) passes, with the primary pass, ink is only discharged by the nozzles of the center nozzle group and the other end side nozzle group, and with the next secondary pass, ink is discharged only from the nozzles of the one end side nozzle group and the center nozzle group. At this time, inside the unit area, the raster line printed by the nozzles of the one end side nozzle group or the other end side nozzle group exists almost alternately with the raster line printed by the nozzles of the center nozzle group (see FIG. 6). In other words, the nozzles of the one end side nozzle group or the other end side nozzle group and the nozzles of the center nozzle group for which there is a difference in the density of the discharged ink are used almost evenly and dispersed inside the unit area, so the color unevenness and density unevenness of the printing results is reliably suppressed.

Also, with this embodiment, for each pass (primary pass, secondary pass), by the nozzle that discharges ink changing, the ink dispersion effect within the flow path that reaches from the cartridge 32 to each nozzle increases. Therefore, there is also the effect of reducing the unevenness due to mixing of same colored ink of relatively dense ink and relatively thin ink inside the flow path.

Figure 7:
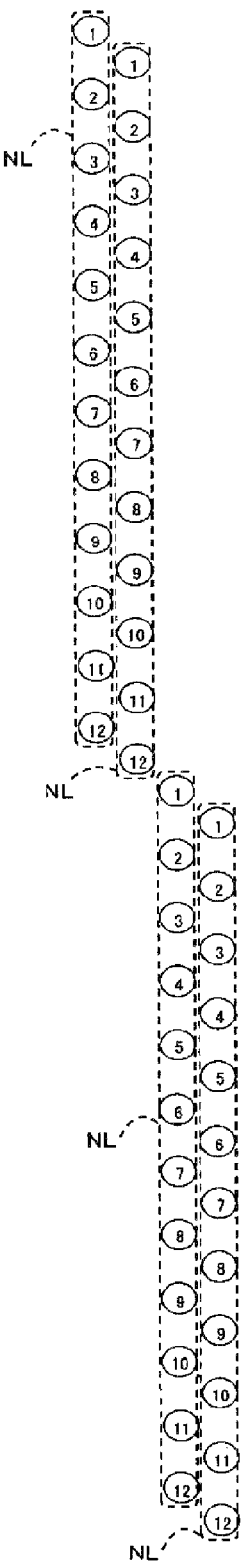
FIG. 7 is a drawing showing the behavior of the nozzle rows with prior art.

FIG. 7 shows the change in the position of the nozzle row NL for each pass (first pass, second pass, third pass, fourth pass, . . . ) with a prior art example compared with this embodiment (FIG. 6). In FIG. 7, ink discharge is executed from each nozzle constituting the nozzle row NL with all passes without dividing by use the one end side nozzle group, the center nozzle group, and the other side nozzle group. Also, the feed volume between the earlier passes (first, third, . . . pass) and the latter passes (second, fourth, . . . passes) for printing one band area (or a pseudo band area) is one dot pitch, and the feed volume between the latter pass for printing that one band area and the first pass for printing the next band area is the feed volume roughly correlating to the width of the band area feed direction (23 dot pitch). With this kind of prior art example, within the band area, an area for which only ink discharged by the nozzles of the one end side nozzle group concentrate, an area for which only ink discharged by the nozzles of the center group concentrate, and an area for which only ink discharged by the nozzles of the nozzles of the other end side nozzle group concentrate respectively occur, and color unevenness and density unevenness stand out with the printing results, but this kind of problem is resolved with this embodiment.

The present invention is not limited to the embodiment described above, and it is possible to implement various modes in a scope that does not stray from its gist, and the embodiments and modification examples described hereafter can be used, for example. Constitutions for which each embodiment and modification example are combined as appropriate also fall within the disclosure scope of the present invention. With the description of the embodiments and modification examples below, items that are in common with the first embodiment will be omitted as appropriate.

3. Second Embodiment

With the second embodiment, we will describe the printer 20 as having the printing head 26 of the mode shown in FIG. 3. With the second embodiment, the designated rule for allocation includes at least the rule that, with the primary pass which is the first pass, of the one end side nozzle group using the plurality of nozzles at one end side of the nozzle row of each segment (first segment CR, second segment MR, third segment YR) with the nozzle row NL2, the other end side nozzle group using the plurality of nozzles of the other end side of the nozzle row of each segment, and the center nozzle group using the plurality of nozzles of that do not correspond to either the one end side nozzle group or the other end side nozzle group of each segment, ink is discharged on a designated area on the print medium from the nozzles included in the center nozzle group and the other end side nozzle group of each segment, and that with the secondary pass that is the next pass after the primary pass, ink is discharged on the designated area from the nozzles included in the center nozzle group and the one end side nozzle group of each segment.

We will give a detailed description of the process of allocating pixels to nozzles at step S130 (FIG. 5) with the second embodiment.

Figure 8:
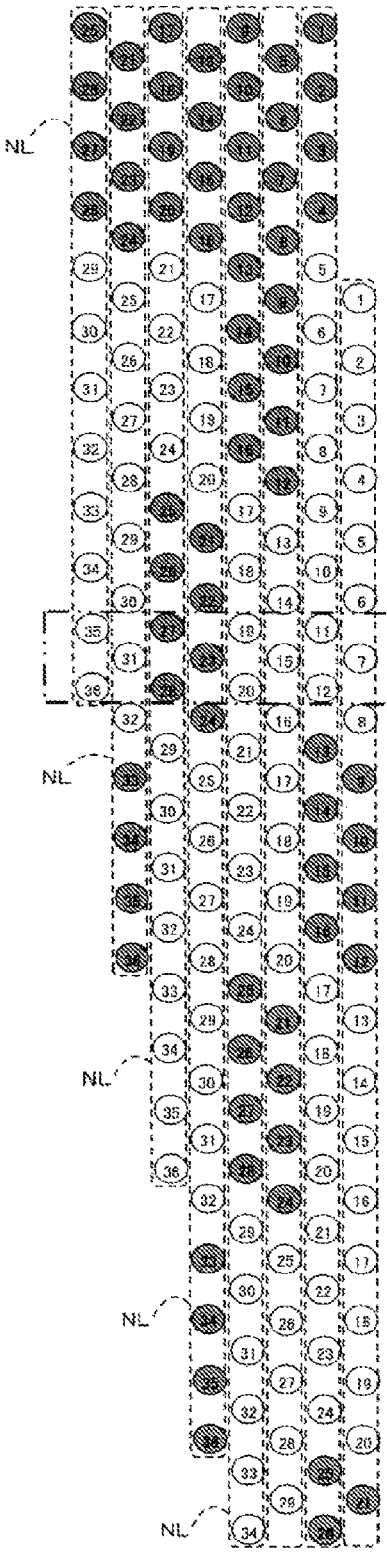
FIG. 8 is a drawing showing an example of the relationship of the allocation of the pixels and nozzles with the second embodiment.

FIG. 8 is a drawing for describing the corresponding relationship of the nozzles constituting the nozzle row NL and the pixels constituting the image data IMC, IMM, and IMY allocated to the nozzles. At the left side of FIG. 8 is shown an example for which the nozzle row NL (dotted line frame) is constituted by a plurality of nozzles (circles). The nozzle row NL shown in FIG. 8 is the nozzle row NL2 shown in FIG. 3. In FIG. 8, the numbers 1 to 36 given to the circles representing nozzles along the lengthwise direction of the nozzle row NL are the nozzle numbers. In FIG. 8, the same as in FIG. 6, shown are changes in the position of the nozzle row NL for each pass by the printing head 26 (first pass, second pass, third pass, fourth pass, . . . ), and the feed volume each time a pass ends is also shown. However, due to circumstances in terms of paper, all the nozzles (nozzle nos. 1 to 36) are not shown for the nozzle row NL of the position corresponding to each pass.

With FIG. 8, the total of twelve nozzle nos. 25 to 36 of the nozzle row NL are the nozzles constituting the C nozzles, in other words, the first segment CR, the total of twelve nozzle nos. 13 to 24 of the nozzle row NL are the nozzles constituting the M nozzles, in other words, the second segment MR, and the total of twelve nozzle nos. 1 to 12 of the nozzle row NL are the nozzles constituting the Y nozzles, in other words, the third segment YR.

The nozzle nos. 25 to 28, nozzle nos. 29 to 32, and nozzle nos. 33 to 36 constituting the first segment CR respectively correspond to the one end side nozzle group, the center nozzle group, and the other end side nozzle group with the first segment CR.

The nozzle nos. 13 to 16, nozzle nos. 17 to 20, and nozzle nos. 21 to 24 constituting the second segment MR respectively correspond to the one end side nozzle group, the center nozzle group, and the other end side nozzle group with the second segment MR.

The nozzle nos. 1 to 4, nozzle nos. 5 to 8, and nozzle nos. 9 to 12 constituting the third segment YR respectively correspond to the one end side nozzle group, the center nozzle group, and the other end side nozzle group with the third segment YR.

At the right side of FIG. 8 is shown an example of a collection of a plurality of pixels (rectangles) for which a portion of the image data IMC, IMM, and IMY are arrayed in the X direction (corresponding to the main scan direction) and the Y direction (corresponding to the feed direction). The image data IMC is print data that stipulates C ink discharge (with dots) or non-discharge (without dots) obtained as a result of step S120 (FIG. 5). Similarly, the image data IMM is print data that stipulates M ink discharge/non-discharge obtained as a result of step S120, and image data IMY is print data that stipulates Y ink discharge/non-discharge obtained as a result of step S120. Impressions for this kind of image data IMC, IMM, and IMY, in other words, for each ink color, should of course be overlapping when seen as one "picture," but with FIG. 8, to make it easier to understand, these are shown as being separated.

With the image data IMC, IMM, and IMY, the respective X direction and Y direction resolutions correspond to the respective print resolutions (e.g. 720 dpi×720 dpi) of the main scan direction and feed direction used by the printer 20. In FIG. 8, the interpretation of the numbers inside the rectangles indicating pixels is the same as for the first embodiment (FIG. 6).

With the example in FIG. 8, a printing method is shown by which printing of one pixel row is completed by the printing head 26 in three passes. These three passes are a total of three passes with one pass for discharging C ink, one pass for discharging M ink, and one pass for discharging Y ink. The discharge of the K ink for printing that one pixel row (discharge of K ink using the nozzles of nozzle row NL1) is executed together with one of the one passes among that total of three passes, for example. With the second embodiment, since the method of discharging the K ink is not important, we will omit any further description.

At step S130, the control unit 11 allocates each of the pixels constituting the image data IMC, IMM, and IMY to one of the nozzles based on the printing method already set for the printer 20 (the action of the printer 20 determined according to the respective print resolutions of the main scan direction and the feed direction, the feed volume of the print medium each time one pass ends (see FIG. 8), the number of passes required to print one pixel row (three times), the designated rule for allocation or the like).

The results of allocation of each pixel to nozzles at step S130 are shown in the image data IMC, IMM, and IMY at the right side of FIG. 8.

In specific terms, focusing on the discharging of C ink, the pixels constituting the odd numbered pixel rows of the image data IMC Y=1 to 16 pixel rows (pixel rows for Y=1, 3, 5, 7, 9, 11, 13, and 15) are allocated to the nozzles constituting the center nozzle group and the other end side nozzle group of the first pass (primary pass) (nozzle nos. 29, 30, 31, 32, 33, 34, 35, and 36 of the first segment CR), and the pixels constituting the even numbered pixel rows of the image data IMC Y=1 to 16 pixel rows (pixel rows for Y=2, 4, 6, 8, 10, 12, 14, and 16) are allocated to the nozzles constituting the one end side nozzle group and the center nozzle group of the second pass (secondary pass when the first pass is regarded as the primary pass) (nozzle nos. 25, 26, 27, 28, 29, 30, 31, and 32 of the first segment CR). Similarly, the pixels constituting the odd numbered pixel rows of the image data IMC Y=17 to 32 pixel rows are allocated to the nozzles constituting the center nozzle group and the other end side nozzle group of the third pass (primary pass) (nozzle nos. 29, 30, 31, 32, 33, 34, 35, and 36 of the first segment CR), and the pixels constituting the even numbered pixel rows of the image data IMC Y=17 to 32 pixel rows are allocated to the nozzles constituting the one end side nozzle group and the center nozzle group of the fourth pass (secondary pass when the third pass is regarded as the primary pass) (nozzle nos. 25, 26, 27, 28, 29, 30, 31, and 32 of the first segment CR). The same as with FIG. 6, in FIG. 8, nozzles for which pixels are not allocated with each pass are represented by a gray color.

Also, focusing on the discharging of M ink, the pixels constituting the odd numbered pixel rows of the image data IMM Y=1 to 8 pixel rows are allocated to the nozzles constituting the center nozzle group and the other end side nozzle group of the third pass (primary pass) (nozzle nos. 17, 18, 19, 20, 21, 22, 23, and 24 of the second segment MR;

however with the third pass, since there are no pixels correlating to the nozzle nos. 17, 18, 19, and 20, these are actually the nozzle nos. 21, 22, 23, and 24), and the pixels constituting the even numbered pixel rows of the image data IMM Y=1 to 8 pixel rows are allocated to the nozzles constituting the one end side nozzle group and the center nozzle group of the fourth pass (the secondary pass when the third pass is regarded as the primary pass) (nozzle nos. 13, 14, 15, 16, 17, 18, 19, and 20 of the second segment MR; however, with that fourth pass, there are no pixels correlating to the nozzle nos. 13, 14, 15, and 16, so in actuality it is nozzle nos. 17, 18, 19, and 20). Similarly, the pixels constituting the even numbered pixel rows of the pixel rows of image data IMM Y=9 to 24 pixel rows are allocated to the nozzles constituting the center nozzle group and the other end side nozzle group of the fifth pass (primary pass) (nozzle nos. 17, 18, 19, 20, 21, 22, 23, and 24 of the second segment MR), and the pixels constituting the even numbered pixel rows of the image data IMM Y=9 to 24 pixel rows are allocated to the nozzles constituting the one end side nozzle group and the center nozzle group of the sixth pass (secondary pass when the fifth pass is regarded as the primary pass) (nozzle nos. 13, 14, 15 16, 17, 18, 19, and 20 of the second segment MR).

Also, focusing on the discharging of Y ink, the pixels constituting the odd numbered pixel rows of the image data IMY Y=1 to 6 pixel rows are allocated to the nozzles constituting the center nozzle group and the other end side nozzle group of the seventh pass (primary pass) (nozzle nos. 5, 6, 7, 8, 9, 10, 11, and 12 of the third segment YR), and the pixels constituting the even numbered pixel rows of the image data IMY Y=1 to 16 pixel rows are allocated to the nozzles constituting the one end side nozzle group and the center nozzle group of the eighth pass (secondary pass when the seventh pass is regarded as the primary pass) (nozzle nos. 1, 2, 3, 4, 5, 6, 7, 8 of the third segment YR).

In other words, even with the second embodiment (FIG. 8) using the nozzle row NL2 shown in FIG. 3 as an example, when we focus on each individual ink color, the division of use of the one end side nozzle group, the center nozzle group, and the other end side nozzle group with the relationship of the primary pass and the secondary pass is performed in the same manner as with the first embodiment (FIG. 6). However, with the second embodiment, the area on the print medium for which ink discharge is performed by one set of the primary pass and the secondary pass in relation to one ink color correlates to the designated area on the print medium.

We will describe the effects of the second embodiment. Due to sedimentation of the ink inside the cartridge 32 (cartridge for each ink color) described above, with the nozzle row NL2, a difference occurs in the density even with the same C ink between the nozzles of the one end side nozzle group inside the first segment CR and the nozzles of the center nozzle group inside the first segment CR. Similarly, with the nozzle row NL2, a difference occurs in the density even with the same M ink between the nozzles of the one end side nozzle group and the other end side nozzle group inside the second segment MR, and the nozzles of the center nozzle group inside the second segment MR, and a difference in density also occurs with the same Y ink between the nozzles of the one end side nozzle group and the other end side nozzle group inside the third segment YR, and the nozzle of the center nozzle group inside the third segment YR. However, with the second embodiment, when performing printing of each ink color with a plurality of passes (two times) of the nozzle row NL2, with the primary pass, ink is discharged from only the nozzles of the center nozzle group and the other end side nozzle group for each first segment CR, second segment MR, the third segment YR, and with the next secondary pass, ink is discharged only from the nozzles of the one end side nozzle group and the center nozzle group for each first segment CR, second segment MR, and third segment YR. Because of that, with the printing results of each ink color, the raster line printed by the nozzles of the one end side nozzle group or the other end side nozzle group and the raster line printed by the nozzles of the center nozzle group exist almost alternately (see FIG. 8). In other words, for any of the ink colors discharged by the nozzle row NL2, there is a difference in the density of the discharged ink, and since the nozzles of the one end side nozzle group or the other end side nozzle group and the nozzles of the center nozzle group are used almost evenly and with dispersion, the color unevenness and density unevenness with the printing results are reliably suppressed.

Also, from the second embodiment, the following kinds of effects are obtained. Focusing on the range enclosed by the double-dot dash line in FIG. 8, we can see that the ink discharged by the 36th nozzle which is one of the C nozzles correlating to the furthest end part of the first segment CR does not touch (does not overlap nor is it adjacent) the ink discharged by the 13th nozzle which is one of the M nozzles correlating to the furthest end part of the second segment MR. On the other hand, we can see that the ink discharged by the 36th nozzle overlaps the ink discharged by the 12th nozzle which is one of the Y nozzles correlating to the furthest end part of the third segment YR. Even among the CMY inks, the C ink and M ink are naturally darker inks than the Y ink. As described above, due to sedimentation inside the cartridge 32, since we see a tendency for darker ink to be discharged the more the nozzle is positioned at the end within each of the segments, if the raster line by the nozzles of the furthest end in the first segment CR and the raster line by the nozzles of the furthest end of the second segment MR touch, a very dark colored printing result is obtained at that touching location, and the unevenness is easy to visually recognize. However, with the second embodiment, since touching of the raster line by the nozzles of the furthest end of the first segment CR and the raster line by the nozzles of the furthest end of the second segment MR is avoided, good image quality without the unevenness is obtained. This kind of effect can be said to be due to, with the nozzle row NL2, of the C nozzles, M nozzles, and Y nozzles, arranging either of the C nozzles or M nozzles at the center segment of the nozzle row (second segment).

4. Modification Examples

With the printing control process, the control unit 11 can switch the color conversion LUT 16A used with the color conversion processing (step S110) according to the mode or the like specified by the user.

FIG. 9 shows an example of an LUT 16A1 at the upper level, and shows an example of an LUT 16A2 at the lower level. Both the LUT 16A1 and 16A2 are types of the color conversion LUT 16A, and define the conversion relationship between the RGB values and the ink volumes for each of CMYK. The LUT 16A1 and the LUT 16A2 have different upper limit values (MAX) for observing when setting the CMYK values corresponding to certain RGB values. What is meant by the upper limit value here includes the upper limit value of the total of the C, M, Y, and K ink volumes, and the upper limit value of each color respectively of the C, M, Y, and K ink volumes. As an example, the LUT 16A1 has the upper limit value of the total of the CMYK ink volumes set to "120," and the ink volumes of each ink color are regulated so as to be within this upper limit value. On the other hand, with the LUT 16A2, as an example, the upper limit value of the total of the CMYK ink volumes is set to "150" which is higher than that of the LUT 16A1, and the ink volume of each ink color is regulated so as to be within this upper limit value.

As can be understood from FIG. 9, for the CMYK values corresponding to the same RGB values, the LUT 16A2 for which the total upper limit value is set high is seen to have a tendency to have higher values set than with the LUT 16A1. With FIG. 9, the upper limit value of each one color respectively of the ink volume of C, M, Y, and K is 100(%) for both LUT 16A1 and LUT 16A2, but for example LUT 16A1 can also be 80(%) or the like. In any case, the LUT 16A1 is an example of the "first color conversion table" predefined using the upper limit (first upper limit value) for the upper limit value, and the LUT 16A2 is an example of the "second color conversion table" predefined using a second upper limit value higher than the first upper limit value for the upper limit value.

The LUT 16A1 and the LUT 16A2 are color conversion tables prepared for each printing mode that the user can select freely, for example. The printing mode is a mode according to the type of print medium used, the type of image printed (photographic, CG, text or the like), or the color developing effect the user desires. With this embodiment, using an environment for which a plurality of color conversion tables are prepared in this way, the printing method can be switched according to whether the color conversion table that has been referenced according to the selection of the mode is the LUT 16A1 or the LUT 16A2, for example.

In specific terms, of the LUT 16A1 and the LUT 16A2, when the ink volume is determined at step S110 by referencing the LUT 16A2, at step S130, the control unit 11 allocates the pixels to the nozzles contained in the center nozzle group and the other end side nozzle group, and in correspondence to the secondary pass, executes the process of allocating the pixels to the nozzles contained in the center nozzle group and the one end side nozzle group (in other words, the process of step S130 described with the first embodiment). Meanwhile, of the LUT 16A1 and the LUT 16A2, when the ink volume is determined at step S110 by referencing the LUT 16A1, at step S130, the control unit 11 correlates to each of the respective passes, and executes the process of allocating the pixels to each nozzle included in the one end side nozzle group, the center nozzle group, and the other end side nozzle group (e.g. the allocation process described with the prior art example (FIG. 7)).

When the ink volume is determined by referencing the LUT 16A2 which uses a relatively high second upper limit value as the upper limit value noted above, compared to when the ink volume is determined by referencing the LUT 16A1, it is easier for a larger amount of ink to be discharged, and as a result, it is easier to visually recognize unevenness on the print medium. In light of that, with the modification example, when the ink volume is determined by referencing the LUT 16A2, by taking a measure of differentiating the nozzles which discharge the ink respectively with the primary and secondary passes such as that described with the first embodiment (or the second embodiment), it is possible to accurately inhibit the unevenness. Meanwhile, when conditions are established by which unevenness does not occur easily from the start (a case when the ink volume is determined by referencing the LUT 16A1 which uses the relatively low first upper limit value as the upper limit value noted above), a measure for differentiating the nozzles for discharging the ink for each pass is not taken, and by using ink discharge of all the nozzles with each pass as with the prior art example, it is possible to increase the printing speed.

The printing device that uses this embodiment is not limited to being the printer 20 that uses the ink cartridge 32 having the absorption member 34 shown by example in FIG. 4. In other words, since it is possible for ink sedimentation to occur even when the ink cartridge does not have the absorption member, it is also possible to use this embodiment for printers that use an ink cartridge (ink tank) of the type that does not have the absorption member.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing device comprising
    a printing head having a nozzle row on which are formed a plurality of nozzles aligned in a first direction and configured to discharge ink, the nozzle row including a one end side nozzle group which is a plurality of nozzles of one end side of the nozzle row, an other end side nozzle group which is a plurality of nozzles of an other end side of the nozzle row, and a center nozzle group which is a plurality of nozzles of the nozzle row and does not correspond to the one end side nozzle group and the other end side nozzle group;
    a control unit configured to convey a print medium in the first direction, configured to move the printing head in a second direction that intersects the first direction, and configured to perform printing by discharging the ink from the nozzles onto the print medium during movement of the printing head; and
    an ink volume determining unit configured to, by referencing a color conversion table for converting a color system used by image data that expresses an image to a color system of the ink discharged by the printing head, determine an ink volume within a designated upper limit value for each pixel of the image data, the control unit being configured to, during a first movement which is the movement, discharge the ink on a designated area on the print medium from the nozzles included in the center nozzle group and the other end side nozzle group while the control unit is configured not to discharge the ink on the designated area from the nozzles included in the one end side nozzle group, and configured to, during a second movement which is the movement the next time after the first movement, discharge the ink on the designated area from the nozzles included in the center nozzle group and the one end side nozzle group while the control unit is configured not to discharge the ink on the designated area from the nozzles included in the other end side nozzle group, the control unit being configured to control discharging of the ink by the nozzles by allocating to the nozzles pixels for which discharge or non-discharge of the ink has been determined based on the ink volume, when the ink volume determining unit, among a pre-defined first color conversion table using a first upper limit value for the upper limit value, and a pre-defined second color conversion table using a second upper limit value higher than the first upper limit value for the upper limit value, references the pre-defined second color conversion table to determine the ink volume, the control unit being configured to allocate pixels to the nozzles included in the center nozzle group and the other end side nozzle group in correspondence to the first movement, and allocate pixels to the nozzles included in the center nozzle group and the one end side nozzle group in correspondence to the second movement, and when the ink volume determining unit references the first color conversion table to determine the ink volume, the control unit being configured to allocate pixels to the nozzles included in the one end side nozzle group, the center nozzle group, and the other end side nozzle group respectively in correspondence to each time of the movement.

2. The printing device according to claim 1, wherein the control unit is configured to print a raster line expressed by ink droplets being aligned in the second direction by discharging the ink from the nozzles during one time of the movement.

3. The printing device according to claim 1, wherein a ratio of a nozzle count of the center nozzle group and the other end side nozzle group relative to a nozzle count of the nozzle row is 3/5 or greater and 3/4 or less, and a ratio of a nozzle count of the center nozzle group and the one end side nozzle group relative to the nozzle count of the nozzle row is 3/5 or greater and 3/4 or less.

4. A printing device configured to convey a print medium in a first direction, configured to move a printing head, which has nozzle row on which are formed a plurality of nozzles aligned in the first direction and configured to discharge ink, in a second direction that intersects the first direction, and configured to perform printing by discharging the ink from the nozzles onto the print medium during movement of the printing head, the nozzle row being constituted such that the nozzle row is segmented into a plurality of segments along the first direction, and a color of the ink discharged by the nozzles is differentiated for each of the segments, the printing device comprising:

a discharge control unit configured to during a first movement which is the movement, among a one end side nozzle group using a plurality of nozzles of one end side of the nozzle row of each of the segments, an other end side nozzle group using a plurality of nozzles of an other end side of the nozzle row of each of the segments, and a center nozzle group using a plurality of nozzles of the nozzle row that do not correspond to the one end side nozzle group and the other end side nozzle group of each of the segments, discharge the ink on a designated area on the print medium from the nozzles included in the center nozzle group and the other end side nozzle group of each of the segments without discharging the ink on the designated area from the nozzles included in the one end side nozzle group of each of the segments, and during a second movement which is the movement the next time after the first movement, discharge the ink to the designated area from the nozzles included in the center nozzle group and the one end side nozzle group of each of the segments without discharging the ink on the designated area from the nozzles included in the other end side nozzle group of each of the segments; and an ink volume determining unit configured to, by referencing a color conversion table for converting a color system used by image data that expresses an image to a color system of the ink discharged by the printing head, determine an ink volume within a designated upper limit value for each pixel of the image data, the discharge control unit being configured to control discharging of the ink by the nozzles by allocating to the nozzles pixels for which discharge or non-discharge of the ink has been determined based on the ink volume, when the ink volume determining unit, among a pre-defined first color conversion table using a first upper limit value for the upper limit value, and a pre-defined second color conversion table using a second upper limit value higher than the first upper limit value for the upper limit value, references the pre-defined second color conversion table to determine the ink volume, the discharge control unit being configured to allocate pixels to the nozzles included in the center nozzle group and the other end side nozzle group in correspondence to the first movement, and allocate pixels to the nozzles included in the center nozzle group and the one end side nozzle group in correspondence to the second movement, and when the ink volume determining unit references the first color conversion table to determine the ink volume, the discharge control unit being configured to allocate pixels to the nozzles included in the one end side nozzle group, the center nozzle group, and the other end side nozzle group respectively in correspondence to each time of the movement.

5. The printing device according to claim 4, wherein the nozzle row is divided into a segment for which the nozzles discharge cyan ink, a segment for which the nozzles discharge magenta ink, and a segment for which the nozzles discharge yellow ink.

6. The printing device according to claim 1, wherein pigment ink is used as the ink.

7. The printing device according to claim 1, wherein the printing head is configured to receive supply of the ink to the nozzles from an ink cartridge that holds the ink using a sponge like material.

8. A printing method comprising:

conveying a print medium in a first direction;

moving a printing head, which has nozzle row on which are formed a plurality of nozzles aligned in the first direction and is configured to discharge ink, in a second direction that intersects the first direction, the nozzle row including a one end side nozzle group which is a plurality of nozzles of one end side of the nozzle row, an other end side nozzle group which is a plurality of nozzles of an other end side of the nozzle row, and a center nozzle group which is a plurality of nozzles of the nozzle row and does not correspond to the one end side nozzle group and the other end side nozzle group;

performing printing by discharging the ink from the nozzles onto the print medium during movement of the printing head;

discharging the ink on a designated area on the print medium from the nozzles included in the center nozzle group and the other end side nozzle group without discharging the ink on the designated area from the nozzles included in the one end side nozzle group during a first movement which is the movement;

discharging the ink on the designated area from the nozzles included in the center nozzle group and the one end side nozzle group without discharge the ink on the designated area from the nozzles included in the other end side nozzle group during a second movement which is the movement the next time after the first movement referencing a color conversion table for converting a color system used by image data that expresses an image to a color system of the ink discharged by the printing head and determining an ink volume within a designated upper limit value for each pixel of the image data; and controlling discharging of the ink by the nozzles by allocating to the nozzles pixels for which discharge or non-discharge of the ink has been determined based on the ink volume, the controlling the discharging of the ink by the allocating including when, among a pre-defined first color conversion table using a first upper limit value for the upper limit value, and a pre-defined second color conversion table using a second upper limit value higher than the first upper limit value for the upper limit value, referencing the pre-defined second color conversion table to determine the ink volume, allocating pixels to the nozzles included in the center nozzle group and the other end side nozzle group in correspondence to the first movement, and allocating pixels to the nozzles included in the center nozzle group and the one end side nozzle group in correspondence to the second movement, and when referencing the first color conversion table to determine the ink volume, allocating pixels to the nozzles included in the one end side nozzle group, the center nozzle group, and the other end side nozzle group respectively in correspondence to each time of the movement.

\* \* \* \* \*